United States Patent
Lambricht et al.

(10) Patent No.: US 10,358,377 B2
(45) Date of Patent: Jul. 23, 2019

(54) GLASS SHEET HAVING A HIGH TRANSMISSION IN THE INFRARED

(71) Applicants: AGC GLASS EUROPE, Louvain-la-Neuve (BE); AGC Inc., Chiyoda-ku (JP)

(72) Inventors: Thomas Lambricht, Perwez (BE); Audrey Dogimont, Sart-Dames-Avelines (BE)

(73) Assignees: AGC GLASS EUROPE, Louvain-la-Neuve (BE); AGC Inc., Chiyoda-ku (JP)

( * ) Notice: Subject to any disclaimer, the term of this patent is extended or adjusted under 35 U.S.C. 154(b) by 191 days.

(21) Appl. No.: 15/322,959

(22) PCT Filed: Jul. 15, 2015

(86) PCT No.: PCT/EP2015/066118
§ 371 (c)(1),
(2) Date: Dec. 29, 2016

(87) PCT Pub. No.: WO2016/008906
PCT Pub. Date: Jan. 21, 2016

(65) Prior Publication Data
US 2018/0118606 A1    May 3, 2018

(30) Foreign Application Priority Data
Jul. 17, 2014  (EP) ..................................... 14177487

(51) Int. Cl.
| C03C 3/087 | (2006.01) |
| C03C 3/095 | (2006.01) |
| C03C 4/10 | (2006.01) |
| G06F 3/0354 | (2013.01) |

(52) U.S. Cl.
CPC .............. C03C 3/087 (2013.01); C03C 3/095 (2013.01); C03C 4/10 (2013.01); G06F 3/03547 (2013.01)

(58) Field of Classification Search
CPC .................................. C03C 3/087; C03C 3/095
See application file for complete search history.

(56) References Cited

U.S. PATENT DOCUMENTS

| 5,656,559 A | 8/1997 | Combes et al. |
| 5,681,782 A | 10/1997 | Amundson, Jr. |
| 2003/0125188 A1 | 7/2003 | Koyama et al. |
| 2004/0121896 A1 | 6/2004 | Landa et al. |
| 2004/0157722 A1 | 8/2004 | Koyama et al. |
| 2004/0162212 A1 | 8/2004 | Koyama et al. |
| 2006/0249199 A1 | 11/2006 | Thomsen et al. |
| 2007/0015654 A1 | 1/2007 | Scheffler-Hudlet et al. |
| 2007/0021289 A1 | 1/2007 | Landa et al. |
| 2007/0024993 A1 | 2/2007 | Kracker et al. |
| 2007/0161492 A1 | 7/2007 | Smith et al. |
| 2007/0209698 A1 | 9/2007 | Thomsen et al. |
| 2009/0124480 A1 | 5/2009 | Landa et al. |
| 2009/0217978 A1 | 9/2009 | Thomsen et al. |
| 2010/0152014 A1 | 6/2010 | Landa et al. |
| 2010/0154477 A1 | 6/2010 | Thomsen et al. |
| 2013/0021300 A1 | 1/2013 | Wassvik |
| 2014/0092052 A1* | 4/2014 | Grunthaner ............. G06F 3/044 345/174 |
| 2014/0326314 A1 | 11/2014 | Dogimont et al. |
| 2015/0072156 A1 | 3/2015 | Dogimont et al. |

FOREIGN PATENT DOCUMENTS

| EP | 0 688 741 A1 | 12/1995 |
| JP | 2007-238398 A | 9/2007 |
| RU | 2 067 560 C1 | 10/1996 |
| WO | 2013/072113 A1 | 5/2013 |
| WO | 2013/150053 A1 | 10/2013 |

OTHER PUBLICATIONS

International Search Report dated Sep. 24, 2015 in PCT/EP2015/066118 filed Jul. 15, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

The invention relates to a glass sheet having a high transmission in the infrared that comprises, in percentages by weight:

| $SiO_2$ | 55-85% |
| $Al_2O_3$ | 0-30% |
| $B_2O_3$ | 0-20% |
| $Na_2O$ | 5-25% |
| CaO | 0-20% |
| MgO | 0-15% |
| $K_2O$ | 0-20% |
| BaO | 0-20% |
| Total iron (expressed in $Fe_2O_3$ form) | 0.002-0.04%; | the composition furthermore comprising at least two components from chromium, selenium, copper, cerium, manganese and antimony; the chromium (expressed in $Cr_2O_3$ form) being in a maximum content of 0.02% by weight; the selenium (expressed in Se form) being in a maximum content of 0.08% by weight; the copper (expressed in CuO form) being in a maximum content of 0.04% by weight; the cerium (expressed in $CeO_2$ form) being in a maximum content of 0.8% by weight; the manganese (expressed in MnO form) being in a maximum content of 1.6% by weight; the antimony (expressed in $Sb_2O_3$ form) being in a maximum content of 0.8% by weight; and the composition being according to the formula:

$$[10.02*(Cr_2O_3/Fe_2O_3)+4*(Se/Fe_2O_3)+2.73*(CuO/Fe_2O_3)+0.7*(CeO_2/Fe_2O_3)+0.23*(MnO/Fe_2O_3)+0.11*(Sb_2O_3/Fe_2O_3)] \geq A;$$

A being equal to 0.30.

20 Claims, No Drawings

GLASS SHEET HAVING A HIGH TRANSMISSION IN THE INFRARED

1. FIELD OF THE INVENTION

The present invention relates to a glass sheet having a high transmission in the infrared. The general field of the invention is that of optical touch panels, for example placed over zones of display surfaces.

Specifically, by virtue of its high transmission in the infrared (IR), the glass sheet according to the invention may advantageously be used in a touch screen, touch panel or touch pad using the optical technology called planar scatter detection (PSD) or even frustrated total internal reflection (FTIR) (or any other technology requiring a high transmission in the IR) to detect the position of one or more objects (for example a finger or stylus) on a surface of said sheet.

Consequently, the invention also relates to a touch screen, a touch panel or a touch pad comprising such a glass sheet.

2. PRIOR-ART SOLUTIONS

PSD and FTIR technologies allow multi-touch touch screens/panels that are inexpensive and that may have a relatively large touch surface (for example from 3 to 100 inches in size) and a small thickness, to be obtained.

These two technologies involve:
(i) injecting infrared (IR) radiation, using light-emitting diodes (LEDs) for example, into a substrate that is transparent in the infrared, from one or more edges/edge faces;
(ii) propagating the infrared radiation inside said substrate (which then plays the role of a waveguide) via a total-internal-reflection optical effect (no radiation "escapes" from the substrate);
(iii) bringing the surface of the substrate into contact with some sort of object (for example, a finger or a stylus) so as to cause a localized disturbance by scattering of radiation in all directions; certain of the deviated rays will thus be able to "escape" from the substrate.

In FTIR technology, the deviated rays form a spot of infrared light on the lower surface of the substrate, i.e. on the surface opposite the touch surface. These deviated rays are detected by a special camera located behind the device.

For its part, PSD technology involves two additional steps after steps (i)-(iii):
(iv) analysing, with a detector, the resulting IR radiation at the edge of the substrate; and
(v) calculating, algorithmically, the position(s) of the object(s) making contact with the surface, from the detected radiation. This technology is especially described in document US 2013/021300 A1.

Fundamentally, glass is a material of choice for touch panels due to its mechanical properties, its durability, it scratch resistance, its optical transparency and because it can be chemically or thermally toughened.

In the case of the glass panels used in PSD or FTIR technology and of very large area and therefore of a relatively large length/width, the optical path of the injected IR radiation is long. In this case, absorption of the IR radiation by the material of the glass therefore has a significant effect on the sensitivity of the touch panel, which may then undesirably decrease over the length/width of the panel. In the case of glass panels used in PSD or FTIR technology and of smaller area, and therefore with a shorter optical path of the injected IR radiation, the absorption of the IR radiation by the material of the glass also has an effect, in particular on the power consumption of the device incorporating the glass panel.

Thus, a glass sheet highly transparent in the infrared is extremely useful in this context, in order to guarantee undegraded or satisfactory sensitivity over the entirety of the touch surface when this surface is large in area. In particular, a glass sheet having an absorption coefficient in the range of wavelengths from 780 to 1200 nm, which wavelengths are generally used in these technologies, equal to or even smaller than 1 $m^{-1}$ is ideal.

In order to obtain a high transmission in the infrared (and in the visible), it is known to decrease the total iron content in the glass (expressed in terms of $Fe_2O_3$ according to standard practice in the field) and thus obtain a glass with a low iron content (or "low iron" glass). Silicate glass always contains iron because the latter is present as an impurity in most of the batch materials used (sand, limestone, dolomite, etc.). Iron exists in the structure of the glass in the form of ferric ions $Fe^{3+}$ and ferrous ions $Fe^{2+}$. The presence of ferric ions $Fe^{3+}$ makes the glass weakly absorbing at short wavelengths in the visible and strongly absorbing in the near ultraviolet (absorption band centred on 380 nm), whereas the presence of ferrous ions $Fe^{2+}$ (sometimes expressed in FeO oxide) is responsible for strong absorption in the near infrared (absorption band centred on 1050 nm). Thus, increasing total iron content (content of iron in its two forms) accentuates absorption in the visible and infrared. In addition, a high concentration of ferrous ions $Fe^{2+}$ decreases transmission in the infrared (in particular in the near infrared). However, to attain an absorption coefficient that is sufficiently low for touch applications in the range of wavelengths from 780 to 1200 nm merely by changing total iron content would require such a large decrease in this total iron content that (i) it would lead to production costs that would be much too high, due to the need for very pure batch materials (materials of sufficient purity in certain cases not even existing), and (ii) it would cause production problems (especially premature wear of the furnace and/or difficulties with heating the glass in the furnace).

It is also known, to further increase the transmission of the glass, to oxidize the iron present in the glass, i.e. to decrease the number of ferrous ions to the gain of ferric ions. The degree of oxidation of a glass is given by its redox ratio, defined as the ratio by weight of $Fe^{2+}$ atoms to the total weight of iron atoms present in the glass i.e. $Fe^{2+}$/total Fe.

In order to decrease the redox ratio of the glass, it is known to add an oxidizing agent to the blend of batch materials. However, most known oxidants (sulphates, nitrates, etc.) do not have a high enough oxidation power to attain the IR transmission values sought for touch-panel applications using FTIR or PSD technology.

3. OBJECTIVES OF THE INVENTION

One objective of the invention, in at least one of its embodiments, is to provide a glass sheet having a high transmission in the infrared. In particular, the objective of the invention is to provide a glass sheet having a high transmission in the near infrared.

Another objective of the invention, in at least one of its embodiments, is to provide a glass sheet that, when it is used as a touch surface in large-area touch screens, touch panels or touch pads, causes little or no decrease in the sensitivity of the touch function.

Another objective of the invention, in at least one of its embodiments, is to provide a glass sheet that, when it is used as a touch surface in more modestly sized touch screens, touch panels or touch pads, has an advantageous effect on the power consumption of the device.

Another objective of the invention, in at least one of its embodiments, is to provide a glass sheet having a high transmission in the infrared and having an acceptable appearance for the chosen application.

Finally, another objective of the invention is to provide a glass sheet having a high transmission in the infrared and that is inexpensive to produce.

4. SUMMARY OF THE INVENTION

The invention relates to a glass sheet having a composition that comprises, in an amount expressed in percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20% |
| Total iron (expressed in $Fe_2O_3$ form) | 0.002-0.04%. |

According to the invention, said composition:

furthermore comprises at least two components from chromium, selenium, copper, cerium, manganese and antimony; the chromium (expressed in $Cr_2O_3$ form) being in a maximum content of 0.02% by weight; the selenium (expressed in Se form) being in a maximum content of 0.08% by weight; the copper (expressed in CuO form) being in a maximum content of 0.04% by weight; the cerium (expressed in $CeO_2$ form) being in a maximum content of 0.8% by weight; the manganese (expressed in MnO form) being in a maximum content of 1.6% by weight; the antimony (expressed in $Sb_2O_3$ form) being in a maximum content of 0.8% by weight; and is according to the formula:

$$[10.02*(Cr_2O_3/Fe_2O_3)+4*(Se/Fe_2O_3)+2.73*(CuO/Fe_2O_3)+0.7*(CeO_2/Fe_2O_3)+0.23*(MnO/Fe_2O_3)+0.11*(Sb_2O_3/Fe_2O_3)] \geq A;$$

A being equal to 0.30.

Thus, the invention is based on an approach that is completely novel and inventive because it allows the stated technical problem to be solved. Specifically, the inventors have demonstrated that it is possible, by combining in a glass composition a low iron content and a particular blend, in specific contents of two or more components from chromium, selenium, copper, cerium, manganese and antimony, to obtain a glass sheet that is very transparent in the IR, with little or no effect on its appearance and colour.

Other features and advantages of the invention will become more clearly apparent on reading the following description.

Throughout the present text, when a range is indicated it is inclusive of its limits. Furthermore, each and every integer value and sub-range in a numerical range are expressly included as though explicitly written. Furthermore, throughout the present text, percentage amount or content values are values by weight expressed relative to the total weight of the glass. Furthermore, throughout the present text, while a total iron content is mentioned, it is expressed in $Fe_2O_3$ form.

Likewise, in a formula, when mention is made of "$Fe_2O_3$", it is in fact the total iron content.

The glass sheet according to the invention may be made of glass belonging to various categories. The glass may thus be soda-lime-silica glass, aluminosilicate glass, borosilicate glass, etc. Preferably, and for reasons of lower production cost, the glass sheet according to the invention is a sheet of soda-lime-silica glass. In this preferred embodiment, the composition of the glass sheet may comprise, in an amount expressed in percentages by total weight of glass:

| | |
|---|---|
| $SiO_2$ | 55-78% |
| $Al_2O_3$ | 0-18% |
| $B_2O_3$ | 0-18% |
| $Na_2O$ | 5-20% |
| CaO | 0-15% |
| MgO | 0-10% |
| $K_2O$ | 0-10% |
| BaO | 0-5% |
| Total iron (expressed in $Fe_2O_3$ form) | 0.002-0.04%. |

More preferably, according to this embodiment, the composition of the glass sheet may comprise, in an amount expressed in percentages by total weight of glass:

| | |
|---|---|
| $SiO_2$ | 60-75% |
| $Al_2O_3$ | 0-6% |
| $B_2O_3$ | 0-4% |
| CaO | 0-15% |
| MgO | 0-10% |
| $Na_2O$ | 5-20% |
| $K_2O$ | 0-10% |
| BaO | 0-5% |
| Total iron (expressed in $Fe_2O_3$ form) | 0.002-0.04%. |

Advantageously, and according to a particular embodiment, the composition of the glass sheet according to the invention is free of boron (which means that it is not deliberately added but may be present in the form of undesirable impurities in very small amounts).

Advantageously and according to another particular embodiment, the composition of the glass sheet according to the invention is free of lithium (which means that it is not deliberately added but may be present in the form of undesirable impurities in very small amounts).

Advantageously and according to another particular embodiment, the composition of the glass sheet according to the invention is free of zinc (which means that it is not deliberately added but may be present in the form of undesirable impurities in very small amounts).

Advantageously and according to another particular embodiment, the composition of the glass sheet according to the invention is free of strontium (which means that it is not deliberately added but may be present in the form of undesirable impurities in very small amounts).

Advantageously and according to yet another particular embodiment, the composition of the glass sheet according to the invention is free of cobalt (which means that it is not deliberately added but may be present in the form of undesirable impurities in very small amounts). Preferably, according to this embodiment, the composition of the glass sheet according to the invention comprises a cobalt content lower than 0.0005% (expressed in Co form). More preferably, the composition of the glass sheet according to the invention comprises a cobalt content lower than 0.0002% or better still lower than 0.0001%. More preferably still, the composition of the glass sheet according to the invention comprises a cobalt content lower than 0.00005% or better still lower than 0.00001%.

In the context of the invention the term "glass" is understood to mean a totally amorphous material, any crystalline material, even partially crystalline material (such as, for example, vitrocrystalline or glass-ceramic materials) thereby being excluded.

The glass sheet according to the invention may be a glass sheet obtained by a float process, a drawing process, or a rolling process or any other known process for manufacturing a glass sheet from a molten glass composition. According to a preferred embodiment according to the invention, the glass sheet is a sheet of float glass. The expression "sheet of float glass" is understood to mean a glass sheet formed by the float process, which consists in pouring molten glass onto a molten tin bath under reducing conditions. As is known, a sheet of float glass has what is called a "tin side", i.e. a side on which the region of the glass near the surface of the sheet is enriched with tin. The expression "enriched with tin" is understood to mean an increase in tin concentration with respect to the composition of the core of the glass, it being possible for said composition to be substantially free of tin or not.

The glass sheet according to the invention may be various sizes and relatively large. It may, for example, have dimensions ranging up to 3.21 m×6 m or 3.21 m×5.50 m or 3.21 m×5.10 m or 3.21 m×4.50 m ("PLF" glass sheets) or even, for example, 3.21 m×2.55 m or 3.21 m×2.25 m ("DLF" glass sheets).

The glass sheet according to the invention may be between 0.1 and 25 mm in thickness. Advantageously, in the case of a touch-panel application, the glass sheet according to the invention may be between 0.1 and 6 mm in thickness. Preferably, in the case of a touch-screen application, for reasons of weight, the glass sheet according to the invention will be 0.1 to 2.2 mm in thickness.

According to the invention, the composition of the glass sheet comprises a total iron content (expressed in terms of $Fe_2O_3$) ranging from 0.002 to 0.04% by weight relative to the total weight of the glass. A total iron content (expressed in $Fe_2O_3$ form) lower than or equal to 0.04% by weight allows the IR transmission of the glass sheet to be further increased. The minimum value ensures that the cost of the glass is not increased too much as such low iron values often require very pure, expensive batch materials or else purification of the latter. Preferably, the composition of the glass sheet comprises a total iron content (expressed in $Fe_2O_3$ form) ranging from 0.002 to 0.02% by weight relative to the total weight of the glass. Most preferably, the composition comprises a total iron content (expressed in $Fe_2O_3$ form) ranging from 0.002 to less than 0.014% by weight relative to the total weight of the glass.

The composition of the glass sheet according to the invention corresponds to the following formula (hereinafter referred to as "formula A"):

$$[10.02*(Cr_2O_3/Fe_2O_3)+4*(Se/Fe_2O_3)+2.73*(CuO/Fe_2O_3)+0.7*(CeO_2/Fe_2O_3)+0.23*(MnO/Fe_2O_3)+0.11*(Sb_2O_3/Fe_2O_3)] \geq A;$$

where A is equal to 0.30.

According to one embodiment of the invention, in the preceding "formula A", A is equal to 0.6 and preferably equal to 0.9. More preferably, in the preceding "formula A", A is equal to 1.2, indeed even 1.5, 1.8, 2.1, 2.4 or better still 2.7. Very preferably, in the preceding "formula A", A is equal to 3.0. Such increasing values of A make it possible to obtain a beneficial effect on the transmission in the IR range of the glass sheet which is increasingly great.

In accordance with the invention, the composition comprises at least two components from chromium, selenium, copper, cerium, manganese and antimony; the chromium (expressed in $Cr_2O_3$ form) being in a maximum content of 0.02% by weight; the selenium (expressed in Se form) being in a maximum content of 0.08% by weight; the copper (expressed in CuO form) being in a maximum content of 0.04% by weight; the cerium (expressed in $CeO_2$ form) being in a maximum content of 0.8% by weight; the manganese (expressed in MnO form) being in a maximum content of 1.6% by weight; the antimony (expressed in $Sb_2O_3$ form) being in a maximum content of 0.8% by weight, it being understood that each of the contents can be zero if the component from chromium, selenium, copper, cerium, manganese and antimony is not present in the composition of the invention.

The particular embodiment of the invention in which the composition comprises chromium and at least one component from selenium, copper, cerium, manganese and antimony has proved to be particularly good in terms of improving the transmission in the IR range.

According to one embodiment of the invention, the composition comprises:
 a $Cr_2O_3/Fe_2O_3$ ratio≤0.5;
 an $Se/Fe_2O_3$ ratio≤2;
 a $CuO/Fe_2O_3$ ratio≤1.2;
 a $CeO_2/Fe_2O_3$ ratio≤20;
 an $MnO/Fe_2O_3$ ratio≤40; and
 an $Sb_2O_3/Fe_2O_3$ ratio≤20; it being understood that each of these ratios can be zero if the component from chromium, selenium, copper, cerium, manganese and antimony is not present in the composition of the invention. This embodiment has the advantage of limiting the presence of the components from chromium, selenium, copper, cerium, manganese and antimony, relative to the iron, below contents which would be prejudicial to an excessively significant extent to certain properties of the final glass sheet (for example its colour or even its cost), without further obtaining a positive effect on its transmission in the IR range.

According to this last embodiment and advantageously, the composition comprises:
 a $Cr_2O_3/Fe_2O_3$ ratio≤0.25;
 an $Se/Fe_2O_3$ ratio≤1;
 a $CuO/Fe_2O_3$ ratio≤0.6;
 a $CeO_2/Fe_2O_3$ ratio≤10;
 an $MnO/Fe_2O_3$ ratio≤20; and
 an $Sb_2O_3/Fe_2O_3$ ratio≤10;
which has the advantage of again limiting the presence of the components from chromium, selenium, copper, cerium, manganese and antimony, relative to the iron, below contents which would still be prejudicial to a relatively significant extent to certain properties of the final glass sheet (for example its colour or even its cost), while obtaining a very limited effect on its transmission in the IR range.

According to an advantageous embodiment of the invention, the composition is according to the formula (hereinafter referred to as "formula B"):

$$[2*(Cr_2O_3/Fe_2O_3)+0.5*(Se/Fe_2O_3)+0.83*(CuO/Fe_2O_3)+0.05*(CeO_2/Fe_2O_3)+0.025*(MnO/Fe_2O_3)+0.05*(Sb_2O_3/Fe_2O_3)] \leq B;$$

B being equal to 2.

This embodiment represents an optimization of the higher contents of the components chromium, selenium, copper, cerium, manganese and antimony, relative to the iron, making it possible to obtain the highest transmission in the IR range, while limiting the impact on other properties of the final glass sheet (for example its colour).

Preferably, in the "formula B", B is equal to 1 and more preferably equal to 0.5 or better still equal to 0.25. Such decreasing values of B, in the "formula B", further improve the abovementioned optimization.

According to one embodiment, the composition of the glass sheet in accordance with the invention comprises at least three components from chromium, selenium, copper, cerium, manganese and antimony. Advantageously, the composition of the glass sheet in accordance with the invention comprises at least four components from chromium, selenium, copper, cerium, manganese and antimony. Such embodiments have the effect of making possible a greater degree of freedom with regard to certain properties of the final glass other than the absorption coefficient and/or certain constraints of productibility of the glass. For example, this may make it possible to more finely vary the impact of each of the components in terms of colour and/or of light transmission of the final glass.

According to another embodiment of the invention, the composition of the glass sheet according to the invention comprises at least two components from chromium, selenium, copper, cerium, manganese and antimony, with the exception of any combination of cerium and antimony. Such a combination in the composition of the invention produces a glass exhibiting a fairly high and generally undesirable ability to insolate.

According to another embodiment of the invention, the composition comprises an $Fe^{2+}$ content (expressed in FeO form) lower than 20 ppm by weight. Preferably, the composition comprises an $Fe^{2+}$ content (expressed in FeO form) lower than 10 ppm, or better still lower than 7 ppm. These content ranges allow very satisfactory properties to be obtained, in particular in terms of transmission of IR. Most preferably, the composition comprises an $Fe^{2+}$ content (expressed in FeO form) lower than 5 ppm, or better still lower than 2.5 ppm.

According to the invention, the glass sheet possesses a high transmission in the IR. More precisely, the glass sheet of the present invention possesses a high transmission in the near infrared.

To quantify the good transmission of the glass in the infrared range, in the present description, the absorption coefficients at the wavelengths of 1050, 950 and 850 nm will be used, which, this being the case, must be as low as possible in order to obtain a good transmission. The absorption coefficient is defined by the ratio of the absorbance to the length of the optical path traced by an electromagnetic ray in a given medium. It is expressed in $m^{-1}$. It is therefore independent of the thickness of the material but depends on the wavelength of the absorbed radiation and on the chemical nature of the material.

In the case of glass, the absorption coefficient ($\mu$) at a chosen wavelength $\lambda$ may be calculated from a measurement of the transmission (T) and refractive index n of the material (thick=thickness), the values of n, $\rho$ and T depending on the chosen wavelength $\lambda$:

$$\mu = -\frac{1}{thick} \cdot \ln\left[\frac{-(1-\rho)^2 + \sqrt{(1-\rho)^4 + 4 \cdot T^2 \cdot \rho^2}}{2 \cdot T \cdot \rho^2}\right]$$

where $\rho = (n-1)^2/(n+1)^2$

Advantageously, the glass sheet according to the invention has an absorption coefficient at a wavelength of 1050 nm lower than 5 $m^{-1}$. Preferably, the glass sheet according to the invention has an absorption coefficient at a wavelength of 1050 nm lower than or equal to 2 $m^{-1}$, or better still lower than or equal to 1.5 $m^{-1}$. Most preferably, the glass sheet according to the invention has an absorption coefficient at a wavelength of 1050 nm lower than or equal to 1 $m^{-1}$, or better still lower than or equal to 1.5 $m^{-1}$.

Also advantageously, the glass sheet according to the invention has an absorption coefficient at a wavelength of 950 nm lower than 5 $m^{-1}$. Preferably, the glass sheet according to the invention has an absorption coefficient at a wavelength of 950 nm lower than or equal to 2 $m^{-1}$, or better still lower than or equal to 1.5 $m^{-1}$. Most preferably, the glass sheet according to the invention has an absorption coefficient at a wavelength of 950 nm lower than or equal to 1 $m^{-1}$.

Also advantageously, the glass sheet according to the invention has an absorption coefficient at a wavelength of 850 nm lower than 5 $m^{-1}$. Preferably, the glass sheet according to the invention has an absorption coefficient at a wavelength of 850 nm lower than or equal to 2 $m^{-1}$, or better still lower than or equal to 1.5 $m^{-1}$. Most preferably, the glass sheet according to the invention has an absorption coefficient at a wavelength of 850 nm lower than or equal to 1 $m^{-1}$.

According to one embodiment of the invention, the composition of the glass sheet may comprise, in addition to impurities, especially contained in the batch materials, a small proportion of additives (such as agents promoting melting or fining of the glass) or elements due to dissolution of the refractories forming the melting furnaces.

According to one advantageous embodiment of the invention, the composition of the glass sheet may furthermore comprise one or more other colouring agents, in a suitable amount depending on the desired effect. This (these) colouring agent(s) may, for example, serve to "neutralize" a slight colour that is obtained and thus make the colouring of the glass of the invention more neutral. Alternatively, this (these) colouring agent(s) may serve to obtain a desired colour.

According to another advantageous embodiment of the invention, combinable with the preceding embodiment, the glass sheet may be coated with a layer or film that allows the slight colour that may be obtained to be modified or neutralized (for example a coloured PVB film).

The glass sheet according to the invention may advantageously be chemically or thermally tempered.

According to one embodiment of the invention, the glass sheet is coated with at least one thin, transparent and electrically conductive layer. A thin, transparent and conductive layer according to the invention may, for example, be a layer based on $SnO_2$:F, $SnO_2$:Sb or ITO (indium tin oxide), ZnO:Al or even ZnO:Ga.

According to another advantageous embodiment of the invention, the glass sheet is coated with at least one antireflective (or antireflection) layer. This embodiment is obviously advantageous in the case where the glass sheet of the invention is used as the front face of a screen. An antireflective layer according to the invention may, for example, be a layer based on low-refractive-index porous silica or it may be made up of a number of strata (multilayer), especially a multilayer of dielectric layers, said multilayer containing low- and high-refractive-index layers in alternation and terminating with a low-refractive-index layer.

According to another embodiment, the glass sheet is coated with at least one anti-smudge layer so as to limit/prevent smudges from soiling it. This embodiment is also advantageous in the case where the glass sheet of the invention is used as the front face of a touch screen. Such a layer may be combined with a thin, transparent and electrically conductive layer deposited on the opposite face. Such a layer may be combined with an antireflective layer deposited on the same face, the anti-smudge layer being placed on the exterior of the multilayer and therefore covering the antireflective layer.

The glass sheet according to the invention may also be treated on at least one of its main faces, for example frosted with an acid or base, so as to for example generate anti-smudge properties or even antireflection or antiglare properties. This is also especially advantageous in the case where the glass sheet of the invention is used as a front face of a screen, be it a touch screen or other screen.

Depending on the desired applications and/or properties, other layers/other treatments may be deposited/carried out on one and/or the other face of the glass sheet according to the invention.

All the embodiments of the glass sheet according to the invention, unless explicitly mentioned otherwise, can, of course, be combined with one another without it being necessary to further describe each of the possible combinations of embodiments.

Moreover, the invention also relates to a touch screen or touch panel or touch pad comprising at least one glass sheet according to the invention, defining a touch surface. According to this embodiment, the touch screen or touch panel or touch pad advantageously uses FTIR or PSD optical technology. In particular, for a screen, the glass sheet is advantageously placed over a display surface. All the embodiments described above with reference to the glass sheet of the invention therefore also apply to the touch screen or touch panel or touch pad according to the invention.

Finally, the invention also relates to the use of a glass sheet according to the invention, in a device employing infrared radiation propagating essentially inside said sheet. All the embodiments described above with reference to the glass sheet of the invention therefore also apply to the use according to the invention.

The expression "radiation propagating essentially inside the sheet" is understood to refer to radiation that propagates through the bulk of the glass sheet between the two main faces of the sheet.

Advantageously, according to one embodiment of the use according to the invention, the infrared radiation propagates by total internal reflection. In this embodiment, the infrared radiation may be injected into the glass sheet from one or more edges of said sheet. The expression "edge of the sheet" is understood to mean each of the four surfaces defined by the thickness of the sheet and substantially perpendicular to the two main faces of the sheet. Again in this embodiment, the infrared radiation may be injected into the glass sheet from one or both main faces at a certain angle.

The following examples illustrate the invention but are not intended to limit its scope in any way.

EXAMPLES

Batch materials were blended in powder form and placed in a crucible in order to be melted, the blend having the base composition given in the following table.

| Base composition | Content [% by weight] |
|---|---|
| CaO | 9 |
| $K_2O$ | 0.3 |
| $Na_2O$ | 14 |
| $SO_3$ | 0.3 |
| $Al_2O_3$ | 0.8 |
| MgO | 4.2 |
| $SiO_2$ | remainder to 100% |

Various samples were prepared with variable amounts of iron and also of at least two components from chromium, selenium, copper, cerium, manganese and antimony, the base composition being kept the same (the silica content being adjusted in each case in order to achieve the 100% in total, taking into account the iron and the additional components from chromium, selenium, copper, cerium, manganese and antimony). Sample 1 (reference/comparative sample) corresponds to a glass of the prior art (what is referred to as extra-clear glass) having a low iron content and no added chromium, selenium, copper, cerium, manganese or antimony. Samples 2-19 correspond to glass sheet compositions according to the invention.

The optical properties of each glass sample in sheet form were measured and, in particular, the absorption coefficients (N) were measured at wavelengths of 850, 950 and 1050 nm via a transmission measurement using a PerkinElmer Lambda 950 spectrophotometer equipped with a 150 mm-diameter integration sphere, the sample being placed in the entrance aperture of the sphere for the measurement.

The following tables show the variation (Δ) in the absorption coefficient at wavelengths of 1050, 950 and 850 nm obtained for samples according to the invention, relative to the value for reference sample 1. The tables likewise illustrate the values calculated for "formulae A and B" according to the invention.

The results show that adding at least two components from chromium, selenium, copper, cerium, manganese and antimony, in content ranges according to the invention, allows at least one of the absorption coefficients at the wavelengths of 850, 950 and 1050 nm to be very significantly decreased, and therefore, generally, the absorption of radiation in the near infrared to be decreased.

| Sample* | 1 (ref) | 2 | 3 | 4 | 5 | 6 | 7 | 8 | 9 |
|---|---|---|---|---|---|---|---|---|---|
| $Fe_2O_3$ tot (%) | 0.010 | 0.011 | 0.0105 | 0.0094 | 0.0095 | 0.0103 | 0.0103 | 0.0102 | 0.0103 |
| $Cr_2O_3$ (%) | —** | 0.0014 | — | 0.0027 | 0.0022 | — | — | 0.0014 | — |
| Se (%) | — | 0.0051 | — | — | — | — | — | — | — |
| CuO (%) | — | — | 0.0086 | — | — | — | — | 0.0054 | 0.0058 |
| $CeO_2$ (%) | — | — | — | 0.01 | 0.0042 | 0.0252 | — | — | 0.0247 |
| MnO (%) | — | — | — | — | — | 0.0715 | 0.0715 | — | — |
| $Sb_2O_3$ (%) | — | — | 0.1378 | — | — | — | 0.156 | — | — |
| Formula A | 0 | 3.1 | 3.7 | 3.6 | 2.6 | 3.3 | 3.3 | 2.8 | 3.2 |
| Formula B | 0 | 1.2 | 1.3 | 0.6 | 0.5 | 0.17 | 0.93 | 0.71 | 0.47 |

-continued

| | | | | | | | | | |
|---|---|---|---|---|---|---|---|---|---|
| Absorption coefficient Δ at 850 nm | −77% | −38% | −95% | −90% | −78% | −60% | +5% | +52% | |
| Absorption coefficient Δ at 950 nm | −87% | −53% | −96% | −94% | −84% | −56% | −27% | −2% | |
| Absorption coefficient Δ at 1050 nm | −86% | −54% | −96% | −95% | −91% | −56% | −48% | −33% | |

| Sample* | 10 | 11 | 12 | 13 | 14 | 15 | 16 | 17 | 18 | 19 |
|---|---|---|---|---|---|---|---|---|---|---|
| $Fe_2O_3$ tot (%) | 0.0099 | 0.0103 | 0.0116 | 0.0110 | 0.0102 | 0.0102 | 0.0102 | 0.0102 | 0.0102 | 0.0104 |
| $Cr_2O_3$ (%) | 0.0013 | — | — | — | — | — | — | — | — | — |
| Se (%) | — | — | 0.0015 | 0.0037 | 0.0054 | 0.0065 | 0.0086 | 0.0026 | 0.0055 | 0.0017 |
| CuO (%) | — | — | — | 0.0058 | — | — | 0.0023 | — | — | — |
| $CeO_2$ (%) | — | 0.0231 | — | — | 0.0148 | — | 0.0055 | 0.0196 | — | — |
| MnO (%) | — | — | 0.0675 | — | — | — | 0.0197 | 0.0404 | 0.0634 | 0.0105 |
| $Sb_2O_3$ (%) | 0.153 | 0.148 | — | — | — | 0.121 | 0.044 | — | — | 0.025 |
| Formula A | 3.0 | 3.1 | 1.9 | 2.8 | 3.1 | 3.9 | 5.3 | 3.3 | 3.6 | 1.1 |
| Formula B | 1.03 | 0.72 | 0.21 | 0.61 | 0.27 | 0.91 | 0.87 | 0.23 | 0.43 | 0.23 |
| Absorption coefficient Δ at 850 nm | −60% | −56% | −78% | −13% | −42% | −46% | −53% | −85% | −64% | −42% |
| Absorption coefficient Δ at 950 nm | −55% | −63% | −68% | −38% | −61% | −58% | −62% | −84% | −76% | −50% |
| Absorption coefficient Δ at 1050 nm | −57% | −66% | −71% | −48% | −67% | −63% | −69% | −88% | −83% | −53% |

*the percentages are percentages by weight
**"—" indicates the absence of addition to the composition of the glass

The invention claimed is:

1. A glass sheet having a composition that comprises, in an amount expressed in percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20% |
| Total iron (expressed in $Fe_2O_3$ form) | 0.002-0.04%; | said composition furthermore comprising at least two components from chromium, selenium, copper, cerium and manganese; the chromium (expressed in $Cr_2O_3$ form) being in a maximum content of 0.02% by weight; the selenium (expressed in Se form) being in a maximum content of 0.08% by weight; the copper (expressed in CuO form) being in a maximum content of 0.04% by weight; the cerium (expressed in $CeO_2$ form) being in a maximum content of 0.8% by weight; the manganese (expressed in MnO form) being in a maximum content of 1.6% by weight;

wherein the composition is zinc-free and $Sb_2O_3$ is not present;

wherein the composition has an absorption coefficient at a wavelength of 1050 nm lower than 5 m$^{-1}$; and wherein the composition is according to the formula:

$$[10.02*(Cr_2O_3/Fe_2O_3)+4*(Se/Fe_2O_3)+2.73*(CuO/Fe_2O_3)+0.7*(CeO_2/Fe_2O_3)+0.23*(MnO/Fe_2O_3)+0.11*(Sb_2O_3/Fe_2O_3)] \geq A;$$

A being equal to 0.30.

2. The glass sheet according to claim 1, wherein the composition comprises a total iron content (expressed in $Fe_2O_3$ form) from 0.002 to 0.02% by weight relative to the total weight of the glass.

3. The glass sheet according to claim 2, wherein the composition comprises a total iron content (expressed in $Fe_2O_3$ form) from 0.002 to less than 0.014% by weight relative to the total weight of the glass.

4. The glass sheet according to claim 1, wherein the composition comprises an $Fe^{2+}$ content (expressed in FeO form) lower than 10 ppm.

5. The glass sheet according to claim 1, wherein the composition comprises an $Fe^{2+}$ content (expressed in FeO form) lower than 5 ppm.

6. The glass sheet according to claim 1, wherein the glass sheet is free of $CeO_2$.

7. The glass sheet according to claim 1, wherein the glass sheet is free of boron, lithium, strontium, and cobalt.

8. The glass sheet according to claim 1, wherein A is equal to 0.6.

9. The glass sheet according to claim 8, wherein A is equal to 0.9.

10. The glass sheet according to claim 1, wherein the composition comprises:
a $Cr_2O_3/Fe_2O_3$ ratio≤0.5;
an $Se/Fe_2O_3$ ratio≤2;
a $CuO/Fe_2O_3$ ratio≤1.2;
a $CeO_2/Fe_2O_3$ ratio≤20; and —an $MnO/Fe_2O_3$ ratio≤40.

11. The glass sheet according to claim 10, wherein the composition comprises:
a $Cr_2O_3/Fe_2O_3$ ratio≤0.25;
an $Se/Fe_2O_3$ ratio≤1;
a $CuO/Fe_2O_3$ ratio≤0.6;
a $CeO_2/Fe_2O_3$ ratio≤10; and —an $MnO/Fe_2O_3$ ratio≤20.

12. The glass sheet according to claim 1, wherein the composition is according to the formula:

$$[2*(Cr_2O_3/Fe_2O_3)+0.5*(Se/Fe_2O_3)+0.83*(CuO/Fe_2O_3)+0.05*(CeO_2/Fe_2O_3)+0.025*(MnO/Fe_2O_3)+0.05*(Sb_2O_3/Fe_2O_3)] \leq B;$$

B being equal to 2.

13. The glass sheet according to claim 1 that has an absorption coefficient at a wavelength of 850 nm lower than 5 m$^{-1}$.

14. A touch screen or touch panel or touch pad, comprising at least one glass sheet according to claim 1 defining a touch surface.

15. The touch screen or touch panel or touch pad according to claim 14 that uses FTIR or PSD optical technology.

16. A device comprising the glass sheet according to claim 1 that employs infrared radiation propagating essentially inside said sheet.

17. The device according to claim 16, wherein the infrared radiation propagates by total internal reflection.

18. A glass sheet having a composition that comprises, in an amount expressed in percentages by total weight of glass:

| | |
|---|---|
| SiO$_2$ | 55-85% |
| Al$_2$O$_3$ | 0-30% |
| B$_2$O$_3$ | 0-20% |
| Na$_2$O | 0-25% |
| CaO | 0-20% |
| MgO | 0-15% |
| K$_2$O | 0-20% |
| BaO | 0-20% |
| Total iron (expressed in Fe$_2$O$_3$ form) | 0.002-0.04%; | said composition furthermore comprising at least two components from chromium, selenium, copper, cerium, manganese and antimony; the chromium (expressed in Cr$_2$O$_3$ form) being in a maximum content of 0.02% by weight; the selenium (expressed in Se form) being in a maximum content of 0.08% by weight; the copper (expressed in CuO form) being in a maximum content of 0.04% by weight; the cerium (expressed in CeO$_2$ form) being in a maximum content of 0.8% by weight; the manganese (expressed in MnO form) being in a maximum content of 1.6% by weight; the antimony (expressed in Sb$_2$O$_3$ form) being in a maximum content of 0.8% by weight;

wherein the composition is according to the formula:

$$[2*(Cr_2O_3/Fe_2O_3)+0.5*(Se/Fe_2O_3)+0.83*(CuO/Fe_2O_3)+0.05*(CeO_2/Fe_2O_3)+0.025*(MnO/Fe_2O_3)+0.05*(Sb_2O_3/Fe_2O_3)] \leq B;$$

B being equal to 0.25.

19. A glass sheet having a composition that comprises, in an amount expressed in percentages by total weight of glass:

| | |
|---|---|
| SiO$_2$ | 55-85% |
| Al$_2$O$_3$ | 0-30% |
| B$_2$O$_3$ | 0-20% |
| Na$_2$O | 0-25% |
| CaO | 0-20% |
| MgO | 0-15% |
| K$_2$O | 0-20% |
| BaO | 0-20% |
| Total iron (expressed in Fe$_2$O$_3$ form) | 0.002-0.04%; | said composition furthermore comprising at least two components from chromium, selenium, copper, and manganese; the chromium (expressed in Cr$_2$O$_3$ form) being in a maximum content of 0.02% by weight; the selenium (expressed in Se form) being in a maximum content of 0.08% by weight; the copper (expressed in CuO form) being in a maximum content of 0.04% by weight; the manganese (expressed in MnO form) being in a maximum content of 1.6% by weight;

wherein the composition is zinc-free, and Sb$_2$O$_3$ and CeO$_2$ are not present.

20. The glass sheet according to claim 19 that has an absorption coefficient at a wavelength of 1050 nm lower than 5 m$^{-1}$.

* * * * *